(12) United States Patent
Park

(10) Patent No.: US 11,143,864 B2
(45) Date of Patent: Oct. 12, 2021

(54) CAMERA MODULE THIN FILM HEATER

(71) Applicant: LG INNOTEK CO., LTD., Seoul (KR)

(72) Inventor: Seung Ryong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 363 days.

(21) Appl. No.: 15/760,528

(22) PCT Filed: Sep. 12, 2016

(86) PCT No.: PCT/KR2016/010261
§ 371 (c)(1),
(2) Date: Mar. 15, 2018

(87) PCT Pub. No.: WO2017/048014
PCT Pub. Date: Mar. 23, 2017

(65) Prior Publication Data
US 2019/0041630 A1    Feb. 7, 2019

(30) Foreign Application Priority Data

Sep. 15, 2015   (KR) .................. 10-2015-0130091

(51) Int. Cl.
*G02B 27/00*      (2006.01)
*G03B 17/55*      (2021.01)
(Continued)

(52) U.S. Cl.
CPC ......... *G02B 27/0006* (2013.01); *G02B 27/00* (2013.01); *G03B 17/55* (2013.01); *H05B 3/26* (2013.01); *H05B 3/28* (2013.01)

(58) Field of Classification Search
CPC .... G02B 27/0006; G02B 27/00; G03B 17/55; H05B 3/26; H05B 3/28; H05B 3/84; H05K 1/0201; H02G 5/00
(Continued)

(56) References Cited

U.S. PATENT DOCUMENTS 4,309,596 A * 1/1982 Crowley .................. H05B 3/56
                                              219/549
4,485,407 A * 11/1984 Bohm .................. H04N 5/2252
                                              348/374
(Continued)

FOREIGN PATENT DOCUMENTS

CN    103676575 A    3/2014
CN    104620671 A    5/2015
(Continued)

OTHER PUBLICATIONS

Supplementary European Search Report dated Aug. 7, 2018 in European Application No. 16846835.3.
(Continued)

*Primary Examiner* — Phuong T Nguyen
*Assistant Examiner* — Yeong Juen Thong
(74) *Attorney, Agent, or Firm* — Saliwanchik, Lloyd & Eisenschenk

(57) ABSTRACT

The present invention provides a camera module thin film heater and a camera module having the same, the camera module thin film inhibiting and avoiding frost, condensation and freezing by reaching a target temperature of a lens within a short period of time, suppressing the generation of fire due to overheating even when operated in a high environment, and not including a temperature sensor and a temperature control unit, thereby greatly reducing the manufacturing cost. The camera module thin film heater comprising: an electrode; a thin film heating body electrically connected to the electrode and having a variable resistance corresponding to a heating temperature; and an insulating member surrounding the electrode and the thin film heating body.

9 Claims, 11 Drawing Sheets

(51) Int. Cl.
*H05B 3/26* (2006.01)
*H05B 3/28* (2006.01)

(58) Field of Classification Search
USPC .................... 219/543, 201, 203; 359/512
See application file for complete search history.

(56) References Cited

U.S. PATENT DOCUMENTS

| | | | | |
|---|---|---|---|---|
| 9,015,868 | B2* | 4/2015 | Matsumoto | A61F 9/028 |
| | | | | 2/435 |
| 2006/0038668 | A1 | 2/2006 | DeWard et al. | |
| 2010/0084161 | A1* | 4/2010 | Neal | B29C 48/022 |
| | | | | 174/126.1 |
| 2012/0170119 | A1* | 7/2012 | Chu | G03B 11/00 |
| | | | | 359/512 |
| 2013/0220994 | A1* | 8/2013 | Hanada | H05B 3/845 |
| | | | | 219/553 |

FOREIGN PATENT DOCUMENTS

| | | |
|---|---|---|
| DE | 295 14 364 U1 | 1/1996 |
| DE | 44 36 087 A1 | 4/1996 |
| EP | 1 626 583 A1 | 2/2006 |
| JP | H11-231696 A | 8/1999 |
| JP | 2001-066934 A | 3/2001 |
| KR | 10-2007-0018642 A | 2/2007 |
| KR | 10-2010-0094838 A | 8/2010 |
| KR | 10-2011-0068442 A | 6/2011 |
| KR | 10-1462983 B1 | 11/2014 |

OTHER PUBLICATIONS

Office Action dated Mar. 20, 2020 in Chinese Application No. 201680053695.7.
International Search Report in International Application No. PCT/KR2016/010261, filed Sep. 12, 2016.

* cited by examiner

CAMERA MODULE THIN FILM HEATER

CROSS-REFERENCE TO RELATED APPLICATIONS

This application is the U.S. national stage application of International Patent Application No. PCT/KR2016/010261, filed Sep. 12, 2016, which claims priority to Korean Application No. 10-2015-0130091, filed Sep. 15, 2015, the disclosures of each of which are incorporated herein by reference in their entirety.

TECHNICAL FIELD

The teachings in accordance with exemplary and non-limiting embodiments of this invention relate generally to a camera module thin film heater and a camera module having the same.

BACKGROUND ART

In general, portable communication equipment such as a smart phone and a tablet PC, a gamer are mounted with a camera module in order to photograph a photograph or an image.

The camera module may include an image sensor that converts an incident outside light to an image, and at least one lens arranged on an optical axis of the image sensor.

The lens is subject to an influence of outside air because of being arranged on an outside of the camera module to thereby allow the lens to be frequently generated with frost, freezing and dew condensation. When the lens is formed with frost, freezing and dew condensation, it should be apparent that the camera module suffers from greatly degraded performances.

Although a hot wire generating a heat used to be arranged on a camera module in order to avoid generation on a lens of frost, freezing and dew condensation, a temperature sensor and a temperature control unit had to be additionally mounted on the camera module in order to inhibit generation of frost, freezing and dew condensation on the lens.

Furthermore, a lot of times are consumed to increase a lens temperature to a designated temperature in order to inhibit frost, freezing and dew condensation on the lens, using a hot wire.

Particularly, when an outside temperature is very low, a lot of times are required to heat the lens temperature to a target temperature, and conversely, when a heat is generated from a hot wire if an outside temperature is high or a temperature of a camera module is high, there is also a high risk of the camera module being burnt out.

Meantime, when a hot wire to control a temperature using a temperature sensor and a temperature control unit is used in order to inhibit a lens from being formed with frost, freezing and dew condensation, it is very difficult design-wise to directly mount a lens on a temperature sensor. In addition, when a temperature sensor is arranged at a place separated from a lens because of difficulty in directly mounting a temperature sensor on the lens, it is difficult to accurately control a temperature on the lens due to difficulty in sensing a temperature accurately.

DETAILED DESCRIPTION OF THE INVENTION

Technical Subject

The present invention is to provide a camera module thin film heater configured to inhibit and avoid frost, dew condensation and freezing by allowing a lens module to reach a target temperature of a lens within a short period of time, and suppressing generation of fire due to overheating, even when operated in a high environment, and by not mounting a temperature sensor and a temperature control unit, thereby greatly reducing a manufacturing cost, and a camera module using the same.

Technical Solution

In one general aspect of the present invention, there is provided a camera module thin film heater, comprising:
an electrode;
a thin film heating body electrically connected to the electrode and having a variable resistance corresponding to a heating temperature; and
an insulation member surrounding the electrode and the thin film heating body.

Preferably, but not necessarily, the electrode may include a first electrode and a second electrode spaced apart from the first electrode, wherein the thin film heating body may be electrically connected to a distal end of the first electrode and the second electrode.

Preferably, but not necessarily, the electrode may include a first electrode and a second electrode spaced apart from the first electrode, wherein the first electrode may include a first width reducer where a width decreases, and the second electrode may include a second width reducer where a width is decreased, and the thin film heating body may be electrically connected to the first and second width reducers.

Preferably, but not necessarily, the electrode may include a first electrode and a second electrode spaced apart from the first electrode, wherein a portion of the first electrode and a portion of the second electrode may be mutually overlapped, and the thin film heating body may be interposed between the first electrode and the second electrode.

Preferably, but not necessarily, the insulation member may include a base film arranged with the electrodes and the thin film heating body, and a cover film bonded to the base film.

In another general aspect of the present invention, there is provided a camera module thin film heater, comprising:
a first heating structure electrically connected to a first electrode and including a first thin film heating body in which a resistance changes in response to a heating temperature;
a second thin film heating structure including a second thin film heating body insulated from the first heating structure and electrically connected to the first heating structure in which a resistance changes in response to a heating temperature; and
an insulation member having an opening to insulate the first and second heating structures and exposing a portion of the first and second electrodes.

Preferably, but not necessarily, the camera module thin film heater may further comprise third electrodes disposed at an outside of the insulation member to be electrically connected to the first and second electrodes through the opening.

Preferably, but not necessarily, the third electrodes may be electrically connected to a transparent heater film that covers a camera lens.

Preferably, but not necessarily, the first electrode may include first and second electrode patterns electrically connected to the first thin film heating body, wherein the second electrode may include third and fourth electrode patterns electrically connected to the second thin film heating body.

Preferably, but not necessarily, the first electrode may include first and second electrode patterns electrically connected to the first thin film heating body, wherein the second electrode may include third and fourth electrode patterns electrically connected to the second thin film heating body, wherein the first and second electrode patterns may include first width reducers in which a width is reduced, the third and fourth electrode patterns may include second width reducers in which a width is reduced, and the first thin film heating bodies may be electrically connected to the first and second width reducers, and the second thin film heating bodies may be electrically connected to the third and fourth electrode patterns.

Preferably, but not necessarily, the first electrode may include a first electrode pattern and a second electrode pattern overlapped with the first electrode pattern, the second electrode may include a third electrode pattern and a fourth electrode pattern overlapped with the third electrode pattern, and the first thin film heating body may be interposed between the first and second electrode patterns, and the second thin film heating body may be interposed between the third and fourth electrode patterns.

Preferably, but not necessarily, the insulation member may include the first and second electrodes, a base film arranged with the first and second heating structures, and a cover film bonded to the base film and formed with openings.

In still another general aspect of the present invention, there is provided a camera module, comprising:

a camera module body including an image sensor, and a lens arranged on an optical axis of the image sensor; and a thin film heater including an electrode, at least one thin film heating body electrically connected to the electrode, variable in resistance in response to a heating temperature and arranged about the lens; and an insulation member encompassing the electrode and the thin film heating body.

Preferably, but not necessarily, a portion of the electrode may be extended along a lateral surface of the camera module body to be electrically connected to an outside terminal.

In still further general aspect of the present invention, there is provided a camera module, comprising:

a camera module body including an image sensor, a lens arranged on an optical axis of the image sensor and a transparent heating film covering the lens; an insulation member including a first heating structure including a first thin film heating body contacted to the lens, electrically connected to a first electrode and changing in resistance in response to a heating temperature, a second heating structure including a second thin film heating body insulated from the first heating structure, electrically connected to a second electrode, and changing in resistance in response to a heating temperature, and an opening exposing a part of the first and second electrodes by insulating the first and second heating structures; and a third electrode electrically connecting the first electrode and the transparent heating film and electrically connecting the second electrode and the transparent heating film.

Preferably, but not necessarily, the transparent heating film may include an ITO (Indium Tin Oxide).

Preferably, but not necessarily, the transparent heating film may be disposed at a bottom surface of the lens facing the thin film heater.

Advantageous Effects

The camera module thin film heater and the camera module using the same according to the present invention is advantageous in that frost, dew condensation and freezing are inhibited and avoided by allowing a lens module to reach a target temperature of a lens within a short period of time, to suppress generation of fire due to overheating, even when operated in a high environment, and by not mounting a temperature sensor and a temperature control unit, thereby greatly reducing a manufacturing cost.

BEST MODE

It should be appreciated that only elements necessary for understanding the exemplary embodiments will be explained and detailed descriptions of well-known functions, configurations or constructions are omitted for brevity and clarity so as not to obscure the description of the present invention with unnecessary detail.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention.

It should be understood that configurations illustrated in the exemplary embodiments and drawings described in the present specification are merely preferable exemplary embodiments, and do not represent all technical ideas of the present invention, and therefore, numerous variations, modifications, and additional embodiments are possible, and accordingly, all such variations, modifications, and embodiments are to be regarded as being within the scope of this application.

Figure 1:
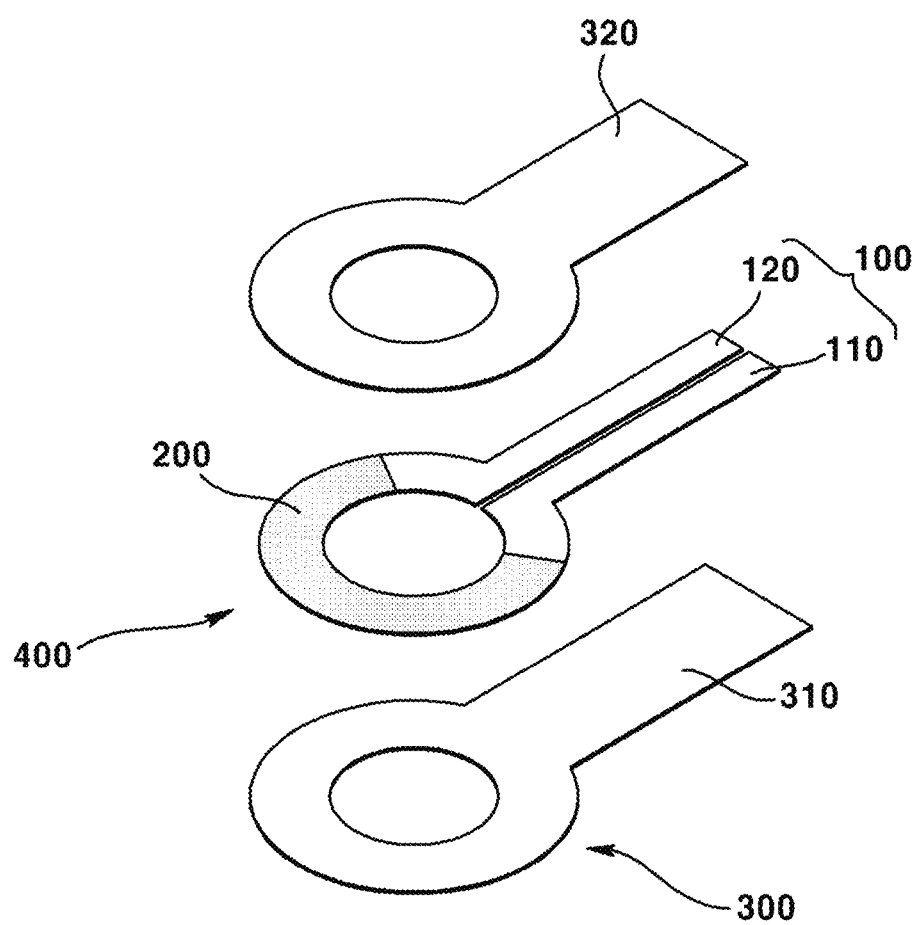
FIG. 1 is an exploded perspective view illustrating a camera module thin film heater according to a first exemplary embodiment of the present invention.

FIG. 1 is an exploded perspective view illustrating a camera module thin film heater according to a first exemplary embodiment of the present invention.

Referring to FIG. 1, the camera module thin film heater (400) according to the first exemplary embodiment of the present invention may include an electrode (100), a thin film heating body (200) and an insulation member (300).

The electrode (100) may include a first electrode (110) and a second electrode (120), for example. The first electrode (110) may be formed to take a thin film shape when viewed from a plane, and the first electrode (110) may be manufactured with a material excellent in electric conductivity.

For example, the conductive material to be used as material for the first electrode (110) may be copper, copper alloy, aluminum and aluminum alloy. In addition thereto, the first electrode (110) may be manufactured with a transparent electrode having an electric conductivity capable of generating a heat by self-resistant component of the first electrode (110) such as an ITO (Indium Thin Oxide), for example.

As illustrated in FIG. 1, the first electrode (110) may be formed in a thin film shape. A portion of the first electrode (110) may be a straight part having a square shape and a curved part having a curved shape may be formed from a distal end of the straight part. The second electrode (120) may be in a state so arranged as to be spaced apart or insulated from the first electrode (110). The second electrode (120) may take a same shape as that of the first electrode (110), for example, and the second electrode (120) may be so arranged as to be symmetrical with the first electrode (110).

The second electrode (120) may be formed to take a thin film shape, when viewed from a plane, and the second electrode (120) may be manufactured with a material excellent in electric conductivity. For example, the second electrode (120) may be manufactured with the same material as that of the first electrode (110).

Although the exemplary embodiment of the present invention has explained that the first and second electrodes (110,120) are made of same material, the first and second electrodes (110,120) may be made with materials having mutually different electric conductivity.

The thin film heating body (200) may be manufactured with a thin film shape, where one end of the thin film heating body (200) may be electrically connected to the first electrode (110), and the other end of the thin film heating body (200) may be electrically connected to the second electrode (120). The thin film heating body (200) and the electrode (100) may be partially overlapped to be electrically connected.

In the exemplary embodiment of the present invention, the thin film heating body (200) may take a partially opened ring shape when viewed from a plane surface, the thin film heating body (200), the first electrode (110) and the second electrode (120) may be mutually electrically connected to form a ring shape when viewed from a plane surface.

The thin film heating body (200) may be electrically connected to the first and second electrodes (110, 120) to allow a power to be provided to the thin film heating body (200) through the first and second electrodes (110,120) whereby a heat can be generated from the thin film heating body (200).

When the first electrode (110), the thin film heating body (200) and the second electrode (120) are mutually electrically connected, these three elements may be formed to take a circular-ring shape when viewed from a plane surface.

The thin film heating body (200) may have an electric resistance-actively changing electric characteristic in response to a current temperature or a heating temperature of the thin film heating body (200).

The thin film heating body (200) in the exemplary embodiment of the present invention may have an electric characteristic where an electric resistance quickly increases when a temperature increases differently from a resistance heating body like a nichrome wire, and the electric resistance conversely decreases when the temperature decreases.

The thin film heating body (200) may include a PTC (Positive Temperature Coefficient) material, and may be manufactured in a shape of a semiconductor device. The thin film heating body (200) in the exemplary embodiment of the present invention may be formed with an opaque material.

In an operation of the thin film heating body (200), when a power is supplied to the thin film heating body (200) through the electrode (100), a heat is started to be generated from the thin film heating body (200) through self-resistance, and an electric resistance of the thin film heating body (200) also increases as the heating temperature of thin film heating body (200) increases.

When the temperature of the thin film heating body (200) increases to a particular temperature, resistance of the thin film heating body (200) also increases, such that the temperature of thin film heating body (200) does not rise to a designated temperature due to increased resistance of the thin film heating body (200), whereby fire can be avoided by the said characteristics of the thin film heating body (200).

Meantime, when the temperature of the thin film heating body (200) decreases, resistance of the thin film heating body (200) also decreases to increase the temperature of thin film heating body (200), where this process is being repeated to allowing maintaining the temperature of the thin film heating body (200) within a predetermined scope.

The thin film heating body (200), in which electric resistances actively change in response to temperatures as detailed above, can advantageously reach a target temperature within a short period of time without separate temperature sensors and temperature control units, and is not heated above a target temperature, and as a result, there is still another advantage of less risk of fire and a predetermined temperature being maintained at all times.

The thin film heating body (200), which has various advantages as discussed above, can be applied to a lens of a camera module frequently generated with frost, freezing and dew condensation by outside air, and installed at a limited space where a temperature sensor is difficult to be directly mounted.

The heating characteristics of the thin film heating body (200) in the exemplary embodiment of the present invention can be variably changed by changing contact conditions between the electrode (100) and the thin film heating body (200).

FIGS. 2 to 6 are plan view and cross-sectional view illustrating various contact methods between an electrode and a thin film heating body.

Figure 2:
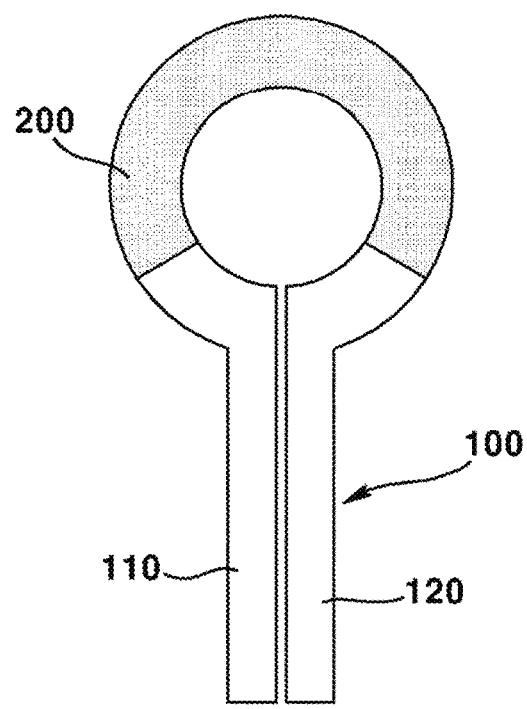
FIGS. 2 to 6 are plan view and cross-sectional view illustrating various contact methods between an electrodes and a thin film heating body.

Referring to FIG. 2, a distal end of one side of the thin film heating body (200) may be electrically connected to an end of the first electrode (110) of the electrode (100), and a distal end of the other side facing the distal end of one side of the thin film heating body (200) may be electrically connected to an end of the second electrode (120) of the electrode (100).

A distance (gap) between the first and second electrodes (110, 120) in a connection structure between the thin film heating body (200) and the electrode (100) in FIG. 2 may be relatively lengthily formed in order to inhibit short-circuit between the first and second electrodes (110, 120).

Figure 3:
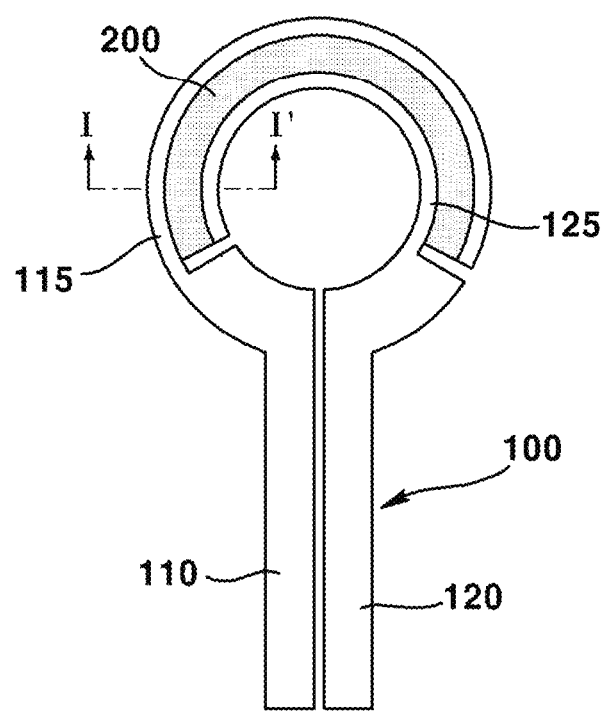
Figure 4:
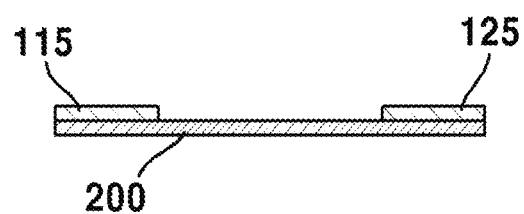

Referring to FIGS. 3 and 4, an end of the first electrode (110) may be formed with a first width reducer (115) formed to be narrower than a width of the first electrode (110), and the first width reducer (115) may be extended toward the second electrode (120). The first width reducer (115) may be formed in a curved shape when viewed from a plane.

An end of the second electrode (120) may be formed with a second width reducer (125) formed to be narrower than a width of the second electrode (120), and the second width reducer (125) may be extended toward the first electrode (110). The second width reducer (125) may be formed in a curved shape when viewed on a plane.

The first width reducer (115) of the first electrode (110) and the second width reducer (125) of the second electrode (120) may be so arranged as to face each other when viewed on a plane, and a space may be formed between the first and second width reducers (115,125).

The thin film heating body (200) may be electrically connected to the first and second width reducers (115,125), and the thin film heating body (200) may be curvedly formed.

A length between the first and second width reducers (115, 125) in the connection structure between the thin film heating body (200) and the electrode (100) in FIGS. 3 and 4 may be formed to be relatively shorter than what is shown in FIG. 2.

Figure 5:
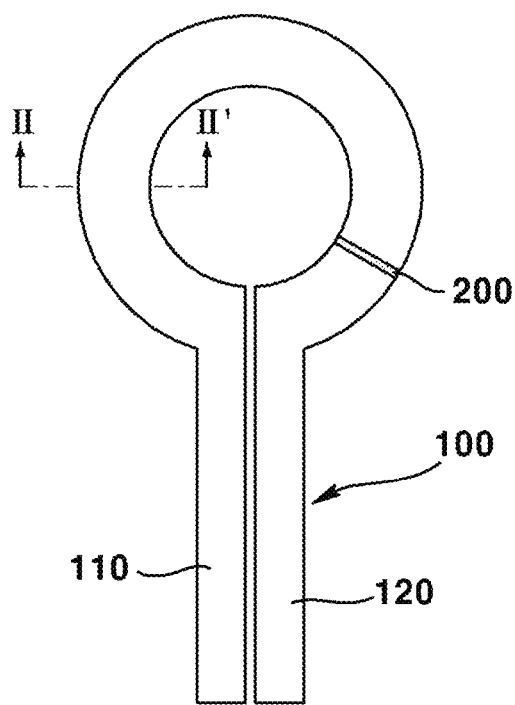
Figure 6:
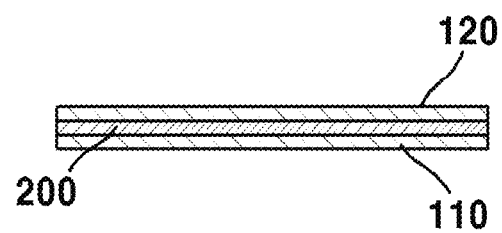

Referring to FIGS. 5 and 6, an end of the first electrode (110) may be extended toward the second electrode (120) without decreased area, and an end of the second electrode (120) may be extended toward the first electrode (110) without decreased area, and the first and second electrodes (110, 120) may be so arranged as to be mutually overlapped. The thin film heating body (200) may be interposed between the first and second electrodes (110,120).

A length between the first and second width reducers (115, 125) in the connection structure between the thin film heating body (200) and the electrode (100) in FIGS. 5 and 6 may be formed to be relatively shorter than what is shown in FIGS. 3 and 4.

As illustrated in FIGS. 2 to 6, an amount of heat generated from the thin film heating body (200) can be changed by variably changing the connection structure between the thin film heating body (200) and the electrode (100).

Referring to FIG. 1 again, the insulation member (300) may function to insulate the thin film heating body (200) and the electrode (100) from an outside conductor wrapping the electrode (100) and the thin film heating body (200) and to inhibit the thin film heating body (200) and the electrode (100) from being damaged by a force applied from an external force.

The insulation member (300) may include a base film (310) and a cover film (320), for example. The electrode (100) and the thin film heating body (200) electrically connected to the electrode (100) may be interposed between the base film (310) and cover film (320). The mutual connection between the base film (310) and the cover film (320) may allow insulating the electrode (100) and the thin film heating body (200) between the base film (310) and the cover film (320).

The camera module thin film heater (400) illustrated in FIGS. 1 to 6 may be particularly adequate when a transparent heating film including the ITO (Indium Tin Oxide) material, which is a transparent electrode, is not formed at an upper surface of a bottom surface of the lens, which is a subject to be heated.

When a transparent heating film comprised of an ITO material which is a transparent electrode is formed on an upper surface or a bottom surface of the lens which is a subject to be heated, the cover film (320) illustrated in FIG. 1 may be formed with the transparent heating film and an opening exposing the first and second electrodes (110, 120) to electrically connect the first and second electrodes (110, 120) forming the electrode (100).

Figure 7:
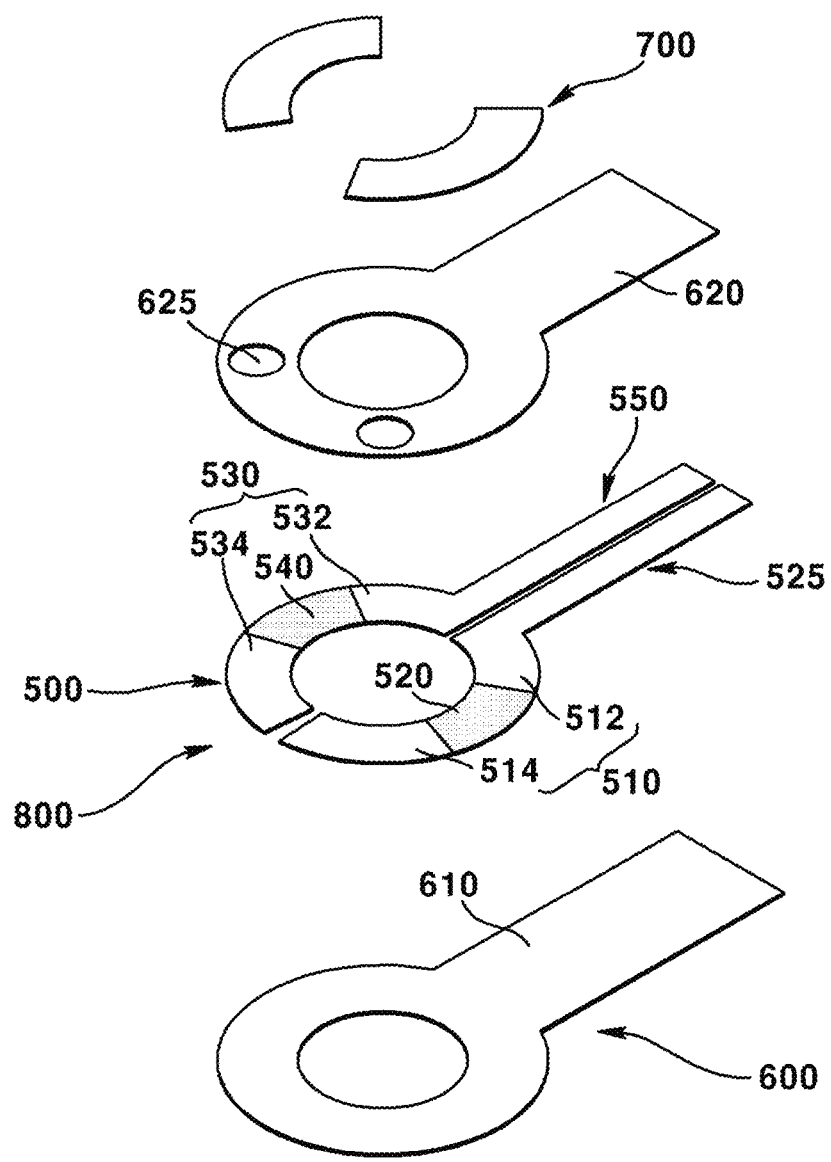
FIG. 7 is an exploded perspective view illustrating a camera module thin film heater according to another exemplary embodiment of the present invention.

FIG. 7 is an exploded perspective view illustrating a camera module thin film heater (800) according to another exemplary embodiment of the present invention.

Referring to FIG. 7, the camera module thin film heater (800) may include a first heating structure (525), a heating structure (500) including a second heating structure (550) and an insulation member (600). The camera module thin film heater in the exemplary embodiment of the present invention may further include a third electrode (700) additionally arranged to the insulation member (600).

The first heating structure (525) may include a first electrode (510) and a first thin film heating body (520). The first electrode (510) and the first thin film heating body (520) may be electrically and mutually connected.

The first electrode (510) may include a first electrode pattern (512) and a second electrode pattern (514), for example. The first electrode pattern (512) may be formed in a thin film shape when viewed from a plane, and the first electrode pattern (512) may be manufactured with a material excellent in electric conductivity.

For example, the conductive material to be used as material for the first electrode pattern (512) may be copper, copper alloy, aluminum and aluminum alloy, for example. In addition thereto, the first electrode pattern (512) may be manufactured with an ITO (Indium Thin Oxide) material, a transparent electrode having an electric conductivity capable of generating a heat by self-resistant component of the first electrode pattern (512) such as an ITO (Indium Thin Oxide).

As illustrated in FIG. 7, the first electrode pattern (512) may include a straight part of rectangular shape, and a curved part extended in a curved shape from an end of the straight part. The second electrode pattern (514) may take a same shape and be made of same material as that of the first electrode pattern (512), and the second electrode pattern (514) may be arranged in a symmetrical shape with the first electrode pattern (512).

Although the first and second electrode patterns (512, 514) are illustrated and explained to be formed with the same conductive material in the exemplary embodiment of the present invention, the first and second electrode patterns (512, 514) may be manufactured with mutually different conductive materials.

The first thin film heating body (520) may be formed in a shape of a thin film or coated with a thin film, and the first thin film heating body (520) may take a curved shape when viewed on a plane.

Unlike a resistance heating body like the nichrome wire, the first thin film heating body (520) may have an electric characteristic in which an electric resistance quickly increases when a temperature increases, and the electric resistance conversely decreases when the temperature decreases.

For example, the first thin film heating body (520) may include a PTC (Positive Temperature Coefficient) material, and may be manufactured in a shape of a semiconductor device. The first thin film heating body (520) may be interposed between the first and second electrode patterns (512,514), where the first and second electrode patterns (512,514) and the first thin film heating body (200) may be electrically and mutually connected.

The first heating structure (525) including the mutually electrically connected first electrode pattern (512), the first thin film heating body (520) and the second electrode pattern (514) may be formed in a semi-circular strip shape adequate for allowing the first heating body (525) to wrap a portion of round lens.

Although the exemplary embodiment of the present invention has explained that the first heating structure (525)

is formed with a semi-circular strip shape, the first heating structure (525) may be changed in shape in response to the lens shape.

Referring to FIG. 7 again, the second heating structure (550) may include a second electrode (530) and a second thin film heating body (540). The second heating structure (550) in the exemplary embodiment of the present invention may be spaced apart from the first heating structure (525), the second heating structure (550) and the first heating structure (525) may be symmetrically arranged.

The second electrode (530) of the second heating structure (550) and the second thin film heating body (540) may be electrically and mutually connected. The second electrode (530) may include a third electrode pattern (532) and a fourth electrode pattern (534). The third electrode pattern may take a shape of a thin film, when viewed on a plane, and the third electrode pattern (532) may be manufactured with a material excellent in electric conductivity.

For example, an electrically conductive material to be used for the third electrode pattern (532) may include a copper, a copper alloy and an aluminum alloy. In addition thereto, the third electrode pattern (532) may be manufactured with an ITO (Indium Thin Oxide) which is a transparent electrode having an electric conductivity capable of generating a heat by self-resistant component.

As illustrated in FIG. 7, a portion of the third electrode pattern (532) may be formed in a shape of a straight line and a portion of the third electrode pattern (532) may be curvedly shaped. The fourth electrode pattern (534) may be spaced apart from the third electrode pattern (532), and the fourth electrode pattern (534) may be manufactured with a same conductive material as that of the third electrode pattern (532).

Although the third and fourth electrode patterns (532, 534) are illustrated and explained to be formed with the same conductive material in the exemplary embodiment of the present invention, the third and fourth electrode patterns (532, 534) may be manufactured with mutually different conductive materials.

The second thin film heating body (540) may be formed in a thin film shape, and the second thin film heating body (540) may be formed with a shape of a curved strip.

Unlike a resistance heating body like the nichrome wire, the second thin film heating body (540) may have an electric characteristic in which an electric resistance quickly increases when a temperature increases, and the electric resistance conversely decreases when the temperature decreases.

For example, the second thin film heating body (540) may include a PTC (Positive Temperature Coefficient) material, and may be manufactured in a shape of a semiconductor device. The second thin film heating body (540) may be interposed between the third and fourth electrode patterns (532,534), where the third and fourth electrode patterns (532,534) and the second thin film heating body (540) may be electrically and mutually connected.

The second heating structure (550) including the mutually electrically connected third electrode pattern (532), the second thin film heating body (540) and the fourth electrode pattern (534) may be formed in a semi-circular strip shape adequate for allowing wrapping remaining portions of lens module that are not wrapped by the first heating structure (525).

Although the exemplary embodiment of the present invention has explained that the second heating structure (550) is formed with a semi-circular strip shape, the second heating structure (550) may be changed in shape in response to the lens shape.

Referring to FIG. 7 again, the insulation member (600) may function to insulate the first heating structure (525) and the second heating body (550) from an outside conductor by wrapping the first heating structure (525) and the second heating body (550) and to inhibit the first heating structure (525) and the second heating body (550) from being damaged by a force applied from an external force.

The insulation member (600) may include a base film (610) and a cover film (620), for example. The first heating structure (525) and the second heating body (550) may be interposed between the base film (610) and cover film (620). The mutual connection between the base film (610) and the cover film (620) may allow insulating the first heating structure (525) and the second heating body (550) between the base film (610) and the cover film (620).

The cover film (620) of the insulation member (600) in the exemplary embodiment of the present invention may be formed with an opening (625) exposing the second electrode pattern (514) and the fourth electrode pattern (534) respectively. The opening (625) may be formed to connect an outside conductor or an outside heater that electrically and mutually connects the first heating structure (525) and the second heating structure (550).

Although the opening (625) is illustrated and explained to be formed at the cover film (620) in the exemplary embodiment of the present invention, the opening (625) may be formed at the first electrode pattern (512) and the second electrode pattern (514).

The third electrode (700) may be disposed on the cover film (620) of the insulation member (600), and the third electrode (700) may be electrically connected to the second electrode pattern (514) and the fourth electrode pattern (534) through the opening (625). The third electrode (700) may be electrically connected to a transparent heating film disposed at an upper surface or a bottom surface of the lens mounted on the camera module.

In the exemplary embodiment of the present invention, the power provided to the first electrode (510) in response to the third electrode (700) and the transparent heating film being electrically connected may pass the first thin film heating body (520), the transparent heating film, the second electrode (530) and second thin film insulator (540) to allow the transparent heating film, the first and second thin film heating bodies (520,540) to generate a heat.

The thin film heating body (520) included in the first heating structure (525) of the camera module thin film heater (800) illustrated in FIG. 7, and the second thin film heating body (540) included in the second heating structure (550) are such that resistance changes in active response to temperature, whereby a target temperature can be advantageously reached within a short period of time without separate temperature sensors and temperature control units, and heat is not reached above a target temperature, and as a result, there is another advantage of less risk of fire and a predetermined constant temperature scope being maintained at all times.

The camera module thin film heater (800), which has various advantages as discussed above, can be easily mounted to a lens of a camera module frequently generated with frost, freezing and dew condensation by outside air, and installed at a limited space where a temperature sensor is difficult to be mounted.

The heating characteristics of the heat-generating first and second thin film heating bodies (520, 540) in the exemplary embodiment of the present invention can be variably realized by changing contact conditions between the first and second electrode patterns (512, 514) and the first thin film heating body (520) and contact conditions between the third and fourth electrode patterns (532, 534) and the second thin film heating body (540).

Figure 8:
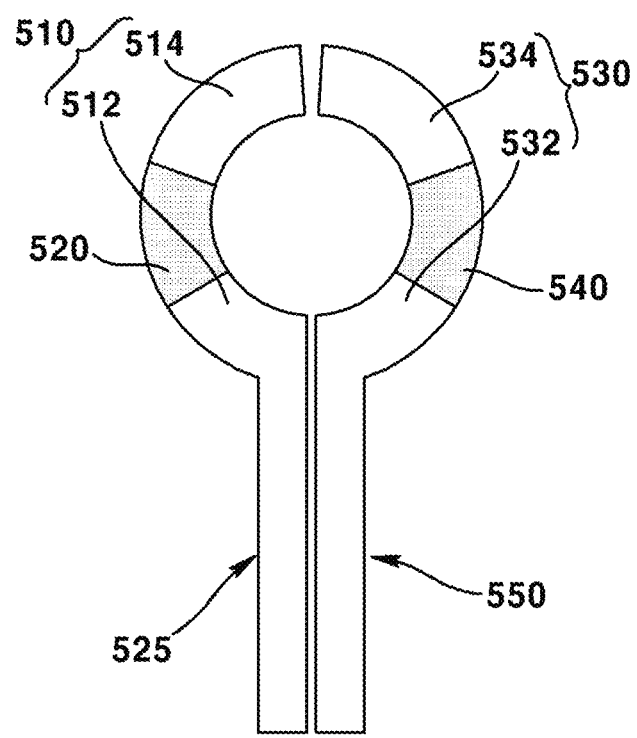
FIGS. 8 to 10 are plan views illustrating various contact methods of first heating structure and second heating structure.
Figure 9:
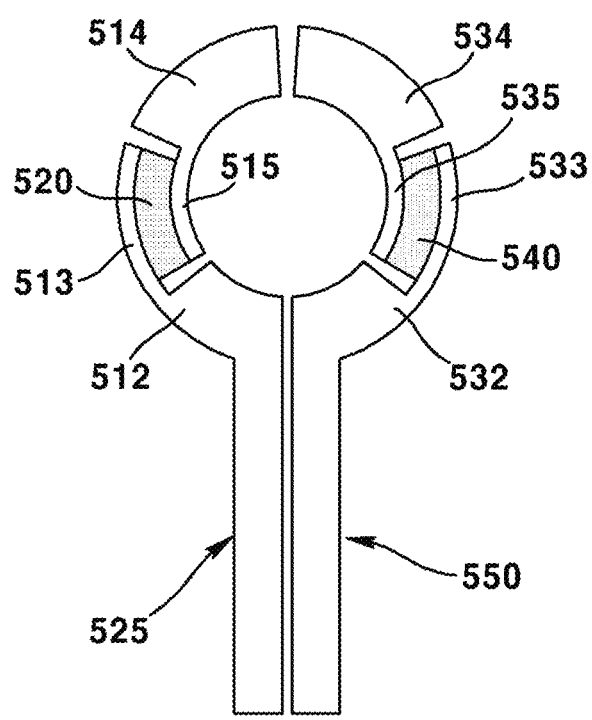
Figure 10:
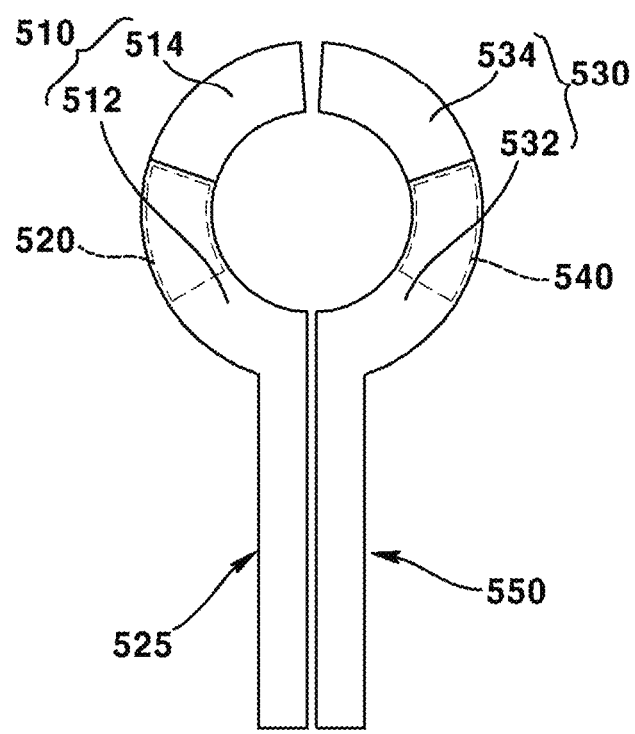

FIGS. 8 to 10 are plan views illustrating various contact methods of first heating structure and second heating structure.

Referring to FIG. 8, a distal end of one side at the first thin film heating body (520) may be contacted in series to the first electrode pattern (512) of first electrode (510) and to the second electrode pattern (514) of the first electrode (510).

A distance between the first and second electrode patterns (512, 514) in the connection structure between the first thin film heating body (520) and the first and second electrode patterns (512,514) may be relatively lengthily formed.

Referring to FIG. 9, an end of the first electrode pattern (512) at the first electrode (510) may be formed with a first width reducer (513) more narrowly formed in width than the first electrode pattern (512), and the first width reducer (513) may be extended toward the second electrode pattern (514).

An end of the second electrode pattern (514) at the first electrode (510) may be formed with a second width reducer (515) more narrowly formed in width than the second electrode pattern (514), and the second width reducer (515) may be extended toward the first electrode pattern (512).

The first thin film heating body (520) may be electrically connected to the first and second width reducers (513,515) respectively. An end of the third electrode pattern (532) at the second electrode (530) may be formed with a third width reducer (533) more narrowly formed in width than the third electrode pattern (532), and the third width reducer (532) may be extended toward the fourth electrode pattern (534).

An end of the fourth electrode pattern (534) at the second electrode (530) may be formed with a fourth width reducer (535) more narrowly formed in width than the fourth electrode pattern (534), and the fourth width reducer (535) may be extended toward the third electrode pattern (532).

The second thin film heating body (540) may be electrically connected to the third and fourth width reducers (533,535).

A distance between the first and second width reducers (513, 515) and the third and fourth width reducers (533, 535) in the connection structure of FIG. 9 may be relatively shortly formed over what is shown in FIG. 8.

Referring to FIG. 10, the first electrode pattern (512) of the first electrode (510) and the second electrode pattern (514) may be mutually overlapped, and the third electrode pattern (532) of the second electrode (530) and the fourth electrode pattern (535) may be mutually overlapped.

The first thin film heating body (520) may be interposed between the mutually overlapped first electrode pattern (512) and the second electrode pattern (514), and a second thin film heating body (540) may be interposed between the mutually overlapped third electrode pattern (532) and the fourth electrode pattern (534).

A distance between the first and second electrode patterns (512, 514) and the third and fourth electrode patterns (532, 534) in the connection structure of FIG. 10 may be relatively shortly formed over what is shown in FIG. 9.

An amount of heat generated from the first and second thin film heating bodies (520, 540) may be controlled by variably changing the connection structure as illustrated in FIGS. 8, 9 and 10.

Figure 11:
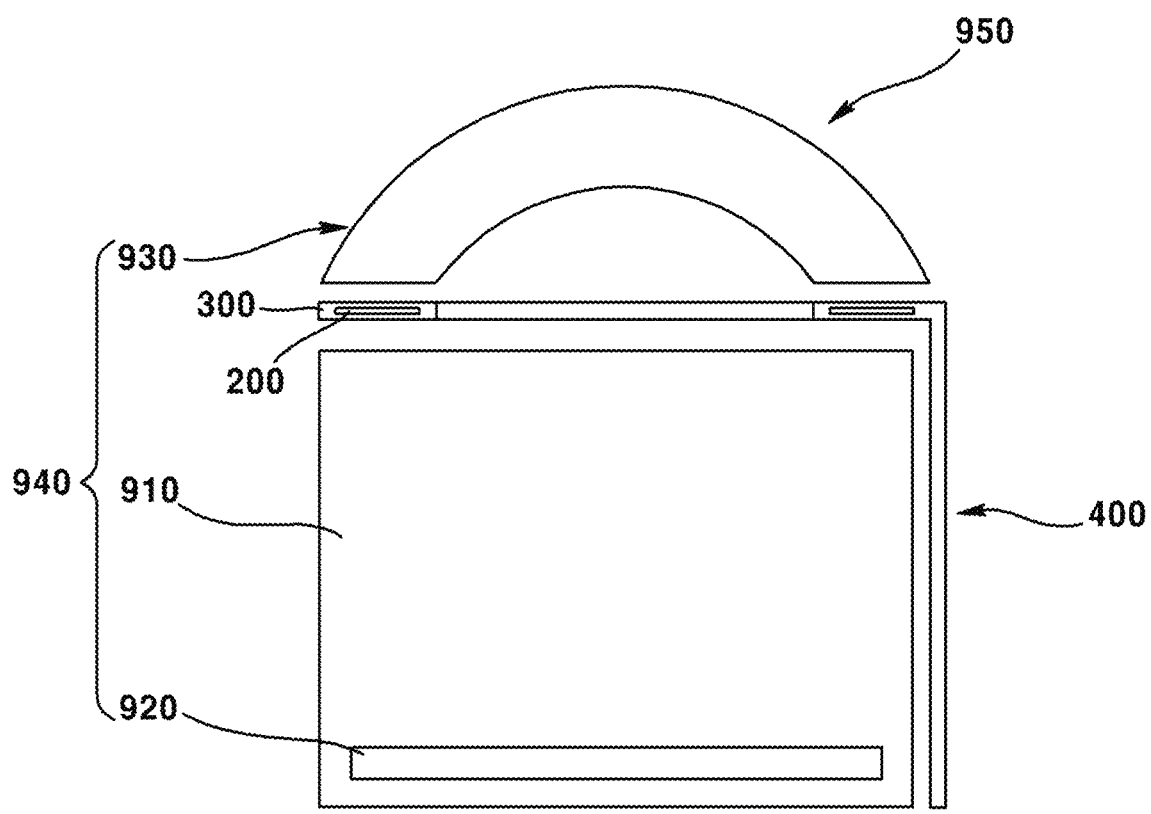
FIG. 11 is a cross-sectional view illustrating a camera module including a thin film heater according to still another exemplary embodiment of the present invention.

FIG. 11 is a cross-sectional view illustrating a camera module including a thin film heater according to still another exemplary embodiment of the present invention.

The camera thin film heater illustrated in FIG. 11 has a substantially same structure as that of the camera module thin film heater (400) illustrated in FIGS. 1 to 6. Thus, any recurrent and repeated explanation that is same in structure will be omitted, and same names and reference numerals will be provided to the same structures.

Referring to FIG. 11, a camera module (950) may include a camera module body (940) and a camera thin film heater (400).

The camera module body (940) may include a body (910) formed with an accommodation space, an image sensor (920) disposed at an inside of the body (910) and a lens (930).

The camera thin film heater (400) in the exemplary embodiment of the present invention may be interposed between the lens (930) and then body (910).

The camera thin film heater (400) may include a thin film heating body (200) generating a heat by a power provided through the electrode (100), where the thin film heating body (200) has an electric characteristic in which resistances are changed in response to the heating temperature.

The camera thin film heater (400) may directly contact the lens (200) to provide a heat to the lens (200), whereby frost, dew condensation and freezing are inhibited from being formed.

A portion of the electrode (100) electrically connected to the thin film heating body (200) in the camera thin film heater (400) may be extended to a bottom surface of the body (910) along a lateral surface of the body (910), and the electrode (100) may be provided with a power from outside.

Figure 12:
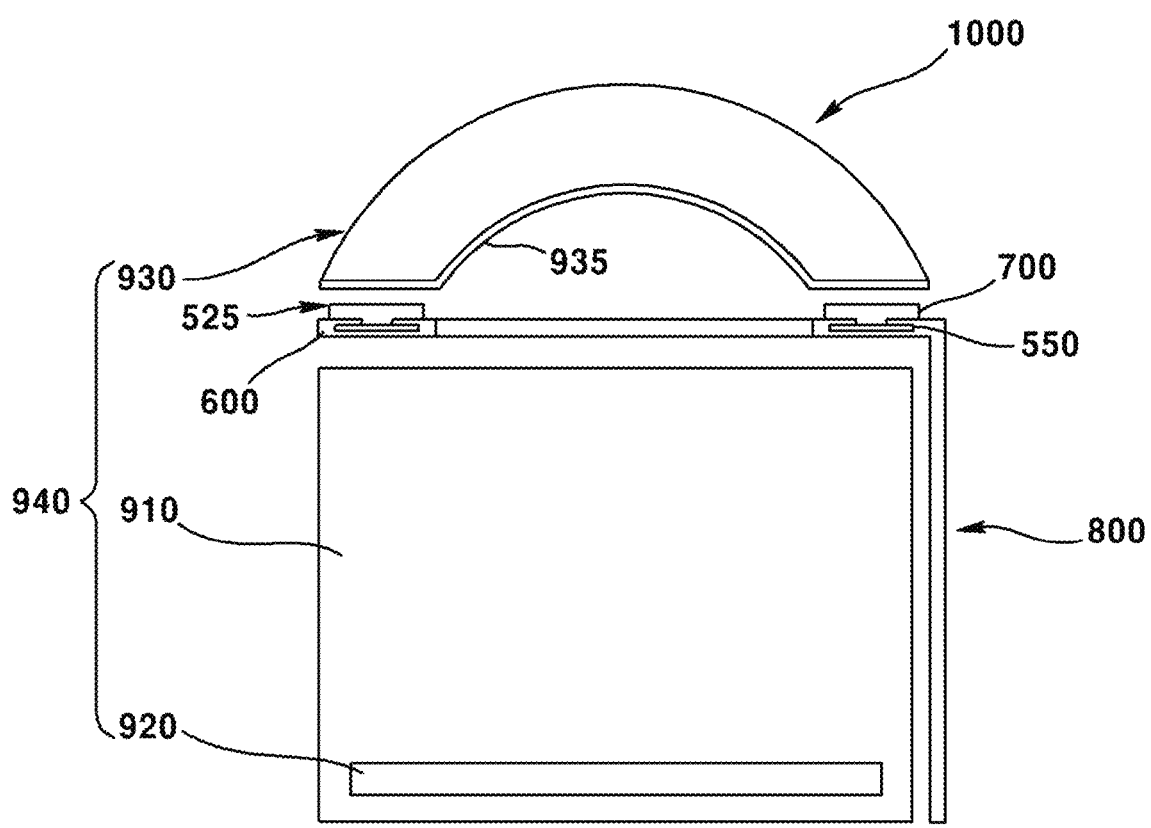
FIG. 12 is a cross-sectional view illustrating a camera module including a thin film heater according to still another exemplary embodiment of the present invention.

FIG. 12 is a cross-sectional view illustrating a camera module (1000) including a thin film heater according to still another exemplary embodiment of the present invention.

The camera thin film heater illustrated in FIG. 12 has a substantially same structure as that of the camera module thin film heater (800) illustrated in FIGS. 7 to 10. Thus, any recurrent and repeated explanation that is same in structure will be omitted, and same names and reference numerals will be provided to the same structures.

Referring to FIG. 12, the camera module (1000) may include a camera module body (940) and a camera thin film heater (800).

The camera module body (940) may include a body (910) formed with an accommodation space, an image sensor (920) disposed at an inside of the body (910) and a lens (930).

A transparent heating film (935) that is transparent and that generates a heat when a power is provided may be formed at a bottom surface of the lens (930) in the exemplary embodiment of the present invention.

Although FIG. 12 has illustrated and explained that the transparent heating film (935) is formed at a bottom surface of the lens (930), the transparent heating film (930) may be formed at an upper surface of the lens (935), and when the transparent heating film (935) is formed at an upper surface of the lens (930), a portion of the transparent heating film (935) may be extended to a bottom surface of the lens (930).

The camera thin film heater (800) in the exemplary embodiment of the present invention may be interposed between the lens (930) and then body (910).

The camera thin film heater (800) may include a first heating structure (525) and a second heating structure (550), and a part of the power provided to the first heating structure (525) may be provided to the first heating structure (525), the transparent heating film (935) and the second heating structure (550), whereby the transparent heating film (935) can be heated.

The transparent heating film (935) in the exemplary embodiment of the present invention may include an ITO (Indium Tin Oxide) material adequate to generating a heat in accordance with the transparent heating film (935) being transparent and being provided with a power.

The first thin film heating body (520) included in the first heating structure (525) and the second thin film heating body (550) included in the second heating structure (550) may be also heated in the course of the transparent heating film (935) being heated, and the first and second thin film heating bodies (520,540) may function as an auxiliary in heat-generation by the transparent heating film (935).

The camera thin film heater (800) may multiply provide heat to the transparent heating film (935) directly formed on the lens (930) and to the first and second thin film heating bodies (520,540) to thereby inhibit the lens (930) from being formed with frost, freezing and dew condensation.

As detailed in the foregoing explanation, the present invention provides a camera module thin film heater and a camera module having the same that can inhibit and avoid frost, condensation and freezing by reaching a target temperature of a lens within a short period of time, suppressing the generation of fire due to overheating even when operated in a high environment, and not including a temperature sensor and a temperature control unit, thereby greatly reducing the manufacturing cost.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

INDUSTRIAL APPLICABILITY

The present invention can be used as a vehicular camera module, an exterior CCTV and a monitoring camera installed on an outside of a vehicle where a temperature difference is great.

The invention claimed is:

1. A film heater comprising:
an insulation member comprising a base film and a cover film disposed above the base film;
a first heating structure disposed between the base film and the cover film and comprising a first electrode and a first film heating panel electrically connected to the first electrode; and
a second heating structure spaced apart from the first heating structure and comprising a second electrode and a second film heating panel electrically connected to the second electrode;
wherein resistance of the first film heating panel is configured to vary corresponding to a heating temperature and wherein a temperature of the first film heating panel does not rise to a designated temperature due to an increase of the resistance of the first film heating panel corresponding to an increase of the heating temperature, wherein when the temperature of the first film heating panel decreases, the resistance of the first film heating panel decreases to increase the temperature of first film heating panel such that the temperature of the first film heating panel is maintained within a predetermined range,
wherein the first electrode and the second electrode are so arranged as to face each other when viewed on a plane and are spaced apart from each other, and
wherein the first electrode comprises a first electrode pattern including a portion having a curved shape and another portion having a linear shape and a second electrode pattern having a curved shape, wherein the first film heating panel is disposed between the first electrode pattern and the second electrode pattern and two ends of the first film heating panel are electrically connected to the first electrode pattern and the second electrode pattern,
wherein each of the first film heating panel and the second film heating panel has a variable resistance corresponding to the heating temperature,
wherein the insulation member comprises an opening exposing a portion of each of the first and second electrodes, and
the film heater further comprising a third electrode disposed at an outside of the insulation member to be electrically connected to the first and second electrodes through the opening.

2. The film heater of claim 1, comprising a transparent heater film, wherein the third electrode is electrically connected to the transparent heater film.

3. The film heater of claim 1, wherein the second electrode comprises third and fourth electrode patterns electrically connected to the second film heating panel.

4. The film heater of claim 1, wherein the cover film is bonded to the base film.

5. The film heater of claim 1, wherein the first electrode and the second electrode are symmetrical to each other.

6. The film heater of claim 1, wherein the film heating panel is formed in a curved shape.

7. A film heater comprising:
a base insulation film;
a cover insulation film coupled to the base insulation film;
a first heating structure disposed between the base insulation film and the cover insulation film and comprising a first electrode and a first film heating panel electrically connected to the first electrode; and
a second heating structure spaced apart from the first heating structure and comprising a second electrode and a second film heating panel electrically connected to the second electrode;
wherein resistance of the first film heating panel is configured to vary corresponding to a heating temperature and wherein a temperature of the first film heating panel does not rise to a designated temperature due to an increase of the resistance of the first film heating panel corresponding to an increase of the heating temperature,
wherein when the temperature of the first film heating panel decreases, the resistance of the first film heating panel decreases to increase the temperature of first film heating panel such that the temperature of the first film heating panel is maintained within a predetermined range, and
wherein the first electrode and the second electrode are so arranged as to face each other when viewed on a plane and are spaced apart from each other and wherein the first electrode comprises a first electrode pattern including a portion having a curved shape and another portion having a linear shape and a second electrode pattern having a curved shape, wherein the first film heating panel is disposed between the first electrode pattern and the second electrode pattern and two ends of the first film heating panel are electrically connected to the first electrode pattern and the second electrode pattern, the film heater further comprising a third electrode disposed at an outside of the cover insulation film to be electrically connected to the first and second electrodes through an opening, and a transparent heater film, wherein the third electrode is electrically connected to the transparent heater film.

8. The film heater of claim 7, wherein each of the first film heating panel and the second film heating panel has a variable resistance corresponding to a heating temperature.

9. The film heater of claim 8, wherein the cover insulation film comprises the opening exposing a portion of each of the first and second electrodes.

* * * * *